(12) United States Patent
Tuttle

(10) Patent No.: US 8,511,504 B2
(45) Date of Patent: *Aug. 20, 2013

(54) DEMISABLE FUEL SUPPLY SYSTEM

(75) Inventor: Wayne H. Tuttle, Torrance, CA (US)

(73) Assignee: Hamilton Sundstrand Corporation, Windsor Locks, CT (US)

(*) Notice: Subject to any disclaimer, the term of this patent is extended or adjusted under 35 U.S.C. 154(b) by 214 days.

This patent is subject to a terminal disclaimer.

(21) Appl. No.: 13/052,862

(22) Filed: Mar. 21, 2011

(65) Prior Publication Data

US 2012/0241459 A1 Sep. 27, 2012

(51) Int. Cl.
*F17C 2270/0197* (2006.01)
*C23C 16/06* (2006.01)
*B64G 1/40* (2006.01)

(52) U.S. Cl.
USPC ............ 220/562; 220/560.7; 220/560.11; 220/560.04; 220/901; 60/259; 60/257; 62/45.1; 62/53.2; 137/154; 137/590; 137/209; 137/574

(58) Field of Classification Search
USPC ............ 220/562, 560.7, 560.11; 60/204, 60/259; 224/172.2, 172.3, 135, 137; 137/154, 137/590
IPC .......................................... B64G 1/40
See application file for complete search history.

(56) References Cited

U.S. PATENT DOCUMENTS

| | | | | | |
|---|---|---|---|---|---|
| 3,097,766 | A | * | 7/1963 | Biehl et al. | 222/135 |
| 3,229,014 | A | * | 1/1966 | Petriello | 264/250 |
| 3,240,644 | A | * | 3/1966 | Wolff | 156/165 |
| 3,356,252 | A | * | 12/1967 | Petriello | 220/62.22 |
| 3,486,302 | A | * | 12/1969 | Paynter | 96/174 |
| 3,535,179 | A | * | 10/1970 | Shriver | 156/172 |
| 3,715,231 | A | * | 2/1973 | Ng et al. | 206/524.3 |
| 3,854,905 | A | * | 12/1974 | Balzer et al. | 96/220 |
| 4,168,718 | A | * | 9/1979 | Frosch et al. | 137/177 |
| 4,235,943 | A | * | 11/1980 | McComas et al. | 427/446 |
| 4,399,831 | A | * | 8/1983 | Robert | 137/154 |
| 4,489,745 | A | * | 12/1984 | Netter et al. | 137/209 |
| 4,672,906 | A | * | 6/1987 | Asai | 114/74 A |
| 4,715,399 | A | * | 12/1987 | Jaekle et al. | 137/209 |
| 4,743,278 | A | * | 5/1988 | Yeh | 96/220 |
| 4,901,762 | A | * | 2/1990 | Miller et al. | 137/574 |

(Continued)

FOREIGN PATENT DOCUMENTS

| | | |
|---|---|---|
| GB | 2270089 A | 3/1994 |
| JP | 2010247719 A | 11/2010 |
| WO | WO2010063449 A1 | 6/2010 |

OTHER PUBLICATIONS

Benton, Joe. Ballinger, Ian. Jaekle, Donald, Osborne, Michael. "Design and Manufacture of a Propellant Tank Assembly". 2007, AIAA p. 5323. ISSN/ISBN: 9781563479038.*

(Continued)

*Primary Examiner* — Bryon Gehman
*Assistant Examiner* — Gideon Weinerth
(74) *Attorney, Agent, or Firm* — Kinney & Lange, P.A.

(57) ABSTRACT

A demisable fuel supply system for a satellite includes a pressurized aluminum alloy tank with an aluminum alloy propellant management device therein. The propellant management device (PMD) can have any capillary action surface tension fluid transport features known in the art. Selected inner surfaces of the tank and the PMD are covered with a titanium based coating to guarantee propellant wettability and corrosion resistance of the fuel supply system.

18 Claims, 2 Drawing Sheets

(56) References Cited

U.S. PATENT DOCUMENTS

| | | | | |
|---|---|---|---|---|
| 4,976,398 A | * | 12/1990 | Bruhn | 244/135 R |
| 5,005,362 A | * | 4/1991 | Weltmer et al. | 62/45.1 |
| 5,150,812 A | * | 9/1992 | Adams | 220/589 |
| 5,263,329 A | * | 11/1993 | Grove et al. | 62/50.1 |
| 5,279,323 A | | 1/1994 | Grove et al. | |
| 5,427,334 A | * | 6/1995 | Rauscher, Jr. | 244/172.2 |
| 5,441,219 A | * | 8/1995 | Rauscher, Jr. | 244/135 R |
| 5,822,838 A | * | 10/1998 | Seal et al. | 29/469.5 |
| 5,901,557 A | * | 5/1999 | Grayson | 62/45.1 |
| 6,082,676 A | * | 7/2000 | Cochran | 244/172.3 |
| 6,290,086 B1 | * | 9/2001 | Franklin et al. | 220/564 |
| 6,422,514 B1 | * | 7/2002 | Clark et al. | 244/135 R |
| 6,499,287 B1 | * | 12/2002 | Taylor | 60/204 |
| 6,984,255 B2 | * | 1/2006 | Itsukaichi et al. | 75/252 |
| 7,395,832 B2 | | 7/2008 | Behruzi et al. | |
| 7,621,291 B2 | * | 11/2009 | Behruzi et al. | 137/154 |
| 8,043,396 B2 | * | 10/2011 | Pessana | 55/426 |
| 8,381,938 B2 | * | 2/2013 | Behruzi et al. | 220/560.11 |
| 8,403,169 B2 | * | 3/2013 | Hafellner et al. | 220/560.11 |
| 2003/0005708 A1 | * | 1/2003 | Beck et al. | 62/45.1 |
| 2007/0084509 A1 | * | 4/2007 | Behruzi et al. | 137/154 |
| 2007/0175905 A1 | * | 8/2007 | Torres et al. | 220/586 |
| 2008/0014420 A1 | * | 1/2008 | Chan | 428/213 |
| 2008/0256960 A1 | * | 10/2008 | Greason et al. | 62/53.2 |

OTHER PUBLICATIONS

Masatomo, Kamata; Furukawa Katsumi, Matsubayashi Masayuki. JP 2010247719 A. Machine Translation obtained from AIPN (Advanced Industrial Property Network) of JPO.*

The extended European Search Report in counterpart European Application No. 12160308.8 filed Mar. 20, 2012.

Jaekle, Jr. D. E., "Propellant Management Device Conceptual Design and Analysis: Vanes" AIAA/ASME/ASEE 27th Joint Propulsion Conference. Jun. 24-26, 1991. Sacramento, CA.

Jaekle, Jr. D.E., "Propellant Management Device Conceptual Design and Analysis: Traps and Troughs" 31st AIAA/ASME/SAE/ASEE Joint Propulsion Conference and Exhibit. Jul. 10-12, 1995. San Diego, CA.

Jaekle, Jr. D. E., "Propellant Management Device Conceptual Design and Analysis: Sponges" AIAA/SAE/ASME/ASEE 29th Joint Propulsion Conference and Exhibit. Jun. 28-30, 1993. Monterey, CA.

Moore, N.R., et al. "A process for producing highly wettable aluminum 6061 surfaces compatible with hydrazine" NASA Technical Report Server, Document ID 20070022851 (2007).

* cited by examiner

DEMISABLE FUEL SUPPLY SYSTEM

BACKGROUND

Satellite fuel tanks are complex devices that use various means to deliver fuel to propulsion systems of the space craft. In a zero or low gravity environment, separating the liquids from pressurizing gases in order to deliver them in sufficient quantities to support mission requirements is difficult. Often, this process is performed with a propellant management device (PMD) that utilizes surface tension and capillary action to transport the liquid fuel. It is imperative that the tank and PMD materials are compatible and wettable with the liquid fuel chemicals such as hydrazine. It is known in the art that materials such as titanium and titanium alloys are used for this purpose because of their high chemical compatibility and wettability with hydrazine and other propellants and oxidizers used to fuel satellites.

One requirement for low earth orbiting (LEO) satellites is the ability to retain enough fuel for a final de-orbit maneuver at end of life. The purpose of this activity is to position the space craft in a controlled re-entry trajectory that allows it to fall into the ocean, thereby reducing the loss of life and property should the debris fall into a populated area. Unfortunately, the amount of fuel needed for this final action could otherwise enable the space craft to remain functional for a period of up to several years if the end of mission re-entry were uncontrolled. Uncontrolled re-entry requirements are that all but a negligible portion of the space craft burn up (demise) during re-entry.

Designs for demise programs have emphasized replacing components fabricated from higher melting point materials such as steels and titanium with lower melting material such as aluminum to increase demisability during re-entry. The fuel tanks for the NASA Global Precipitation Measurement satellite (GPM) have been designed with aluminum fuel tanks and PMDs for this purpose. A special surface treatment to increase the chemical compatibility and wettability of aluminum alloys used for the GPM components has been expensive, labor intensive, and difficult to verify in completed tank structures.

SUMMARY

In one embodiment, a demisable fuel supply system has a liquid storage tank and propellant management devices. The liquid storage tank and propellant management devices are fabricated from aluminum alloys. Selected areas of the inside surface of the liquid storage tank and surfaces of the propellant management devices are coated with a titanium based coating to guarantee high wettability of and corrosion protection against the propellant.

In another embodiment, a method of manufacturing a demisable fuel supply system comprises first fabricating aluminum based components of the fuel supply system. The components are then partially assembled and joined, such as by welding or mechanical fastening. Selected areas of the tank and component inside surfaces are then coated with a titanium based coating before final assembly of the tank by welding.

DETAILED DESCRIPTION

National and international agreements have emphasized end of mission re-entry from near earth orbit (NEO) to minimize hazardous orbital debris. Controlled re-entry, whereby the space craft is put into a trajectory with a predetermined landing site, such as an ocean, has been the accepted practice in order to minimize personal or property damage. Uncontrolled re-entry requires that the space craft completely burn up (demise) before impact. A demisable satellite mission can be extended for up to a number of years because of the fuel saved by not having to position the spacecraft in an orientation for a proper trajectory during controlled re-entry.

The recent NASA Global Precipitation Measurement (GPM) satellite has been the first to design according to a "design for demise" (DfD) specification for exactly the above reasons. In DfD designs, low melting metals and other materials comprise most or all of the structures. Aluminum is favored because of its relatively low melting point. Steel and titanium satellite components do not demise during re-entry. A fuel supply system for the GPM satellite comprises a pressurized composite over-wrapped pressure vessel (COPV), an aluminum tank liner and aluminum propellant management devices (PMD). In a zero gravity environment, fuel transport in PMD systems is by capillary action and wettability of the tank and PMD components by the propellant is an absolute necessity for the fuel systems to operate. Unfortunately, the wettability of hydrazine and other fuels and oxidizers on normal clean aluminum surfaces is insufficient to allow aluminum PMD systems to work. A solution was found, however, that creates a hydrated oxide surface layer on certain aluminum alloys that achieved sufficient wettability and allowed the aluminum PMD systems to function. The surface treatment is expensive, labor intensive, and fragile. Exposure to normal "shop air" for example, can render the surface non-wettable and would disable the GPM PMD before launch. Additionally, exposure to common chemicals normally used in processing and testing satellite fuel tanks are destructive to the hydrated oxide coated aluminum surfaces. Finally, the wettability of the treated aluminum surfaces cannot be directly tested after the tank has been constructed and use of similarly treated test coupons is an inferior and marginally acceptable qualification and certification procedure.

An embodiment of this invention is to coat the tank interior and all internal PMD structures with a thin layer of a titanium based coating before final assembly, thereby guaranteeing acceptable wettability and corrosion resistance of the propellant delivery system. Another embodiment is to coat only the PMD and all its fluid communication components and not the entire tank liner.

Figure 1:
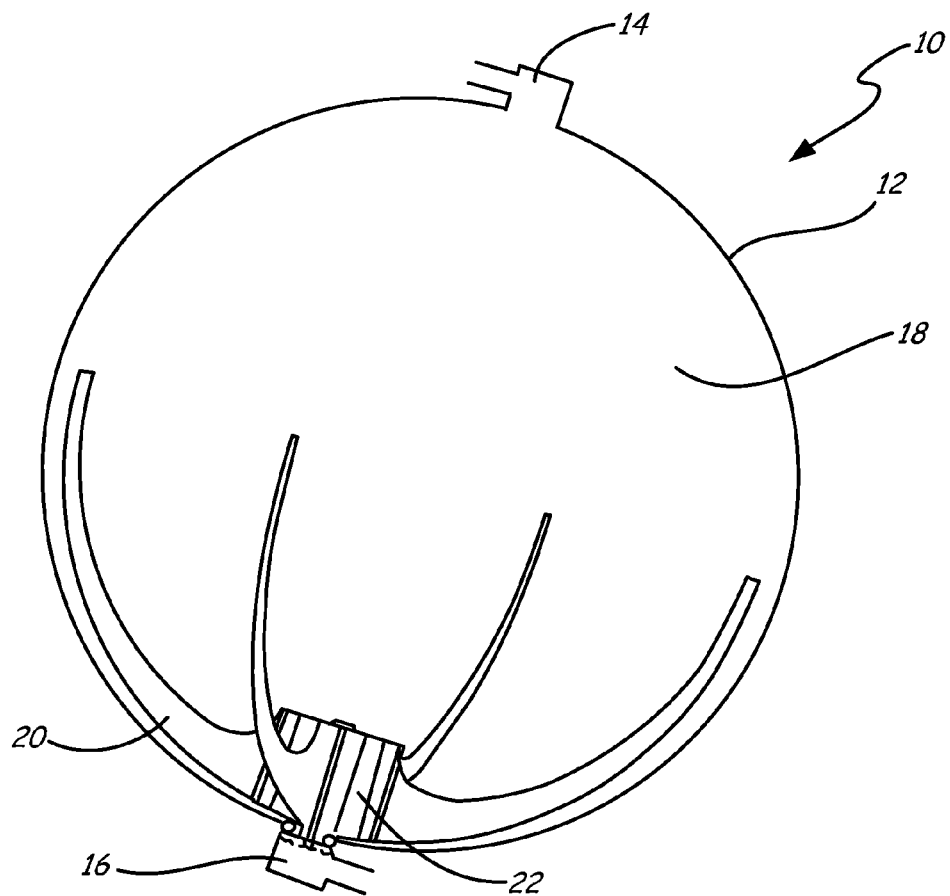
FIG. 1 is a schematic illustration of a propellant tank with propellant management components therein.

An example of a propellant delivery system will now be discussed. The system is only an example and is not to be taken as limiting in any respect to propellant delivery systems now known or to be developed. A schematic sketch of propellant delivery system 10 is shown in FIG. 1. Propellant delivery system 10 is a monopropellant delivery system where a single fuel such as hydrazine is used. Bipropellant propulsion systems using a fuel and an oxidizer are also in common use. Delivery system 10 includes tank 12, inlet gas flow line 14, outlet liquid flow line 16, propellant 18, vanes 20, and sponge 22. Vanes 20 deliver propellant 18 to sponge 22 where collected and stored propellant 18 in sponge 22 is drawn from liquid flow line 16 when required by the propulsion system.

Demisable propellant delivery system 10 is preferably fabricated from an aluminum alloy. Aluminum alloys suitable for this purpose include, but are not limited to, 6061, 2219, and 2014 alloys.

In zero gravity environments, surface tension forces and capillary action are necessary driving forces to deliver propellant in space crafts such as satellites. A primary function of propellant management devices is to deliver fuel without gas bubbles to a propulsion system. Gas entrained in a fuel line may result in engine malfunction. Normal filters for this purpose are titanium alloy screens where liquid passes through the screens by capillary action and gas bubbles are left behind.

Figure 1A:
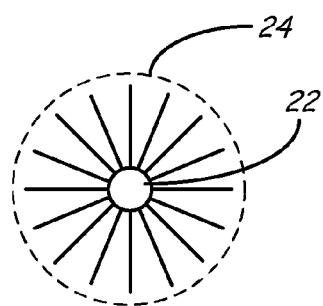
FIG. 1A is a schematic sketch of a top view of a sponge propellant management component.
Figure 1B:
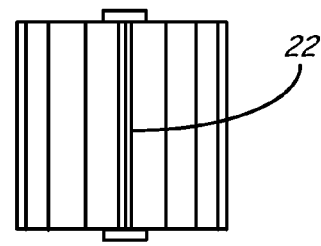
FIG. 1B is a schematic sketch of a side view of a sponge propellant management component.

Vanes 20 may be simple thin metallic ribs aligned perpendicular to tank shell 12 as shown in FIG. 1. The propellant collects at the intersection of vane 20 and tank shell 12 and is held in place by surface tension and meniscus forces. Collecting sponge 22 may be a radial assembly of vertical panels. FIGS. 1A and 1B are top and side view, respectively, of sponge 22. In a similar fashion, propellant is held in place by surface tension and meniscus forces and fills area inside dotted circle 24 along the entire length of sponge 22. Other collection reservoirs (not shown) are traps and troughs. Vanes, sponges, traps and troughs are described by D. E. Jaekle, Jr. in American Institute of Aeronautics and Astronautics Papers AIAA-91-2172, AIAA-93-1970, and AIAA-95-2531, respectively, for instance.

As noted above, an embodiment of the present invention is to coat all surfaces of the fuel supply system that are in contact with propellant with a titanium based coating in order to guarantee wettability and corrosion resistance throughout the life of a mission. Preferable titanium based coatings are, but are not limited to, pure titanium and Ti-6Al-4V, and Ti-15V-3Cr-3Sn-3Al alloys. Deposition methods include physical vapor deposition, chemical vapor deposition, sputtering, electroplating, and other methods known in the art. During re-entry, the thin titanium based coating becomes an inconsequential component of the structure as the aluminum components burn up. As mentioned above, another embodiment is to coat only PMD components and fluid communication surfaces with the titanium based coating to ensure acceptable fuel supply during the mission.

Two tank configurations are preferred for satellite fuel systems. One embodiment is a simple aluminum pressurized tank containing propellant management devices (PMD). The other embodiment is an aluminum pressurized tank surrounded by an overwrap of a composite containment shell called a composite overwrap pressure vessel or COPV. In a COPV, the aluminum tank is called a liner in the art.

Figure 2:
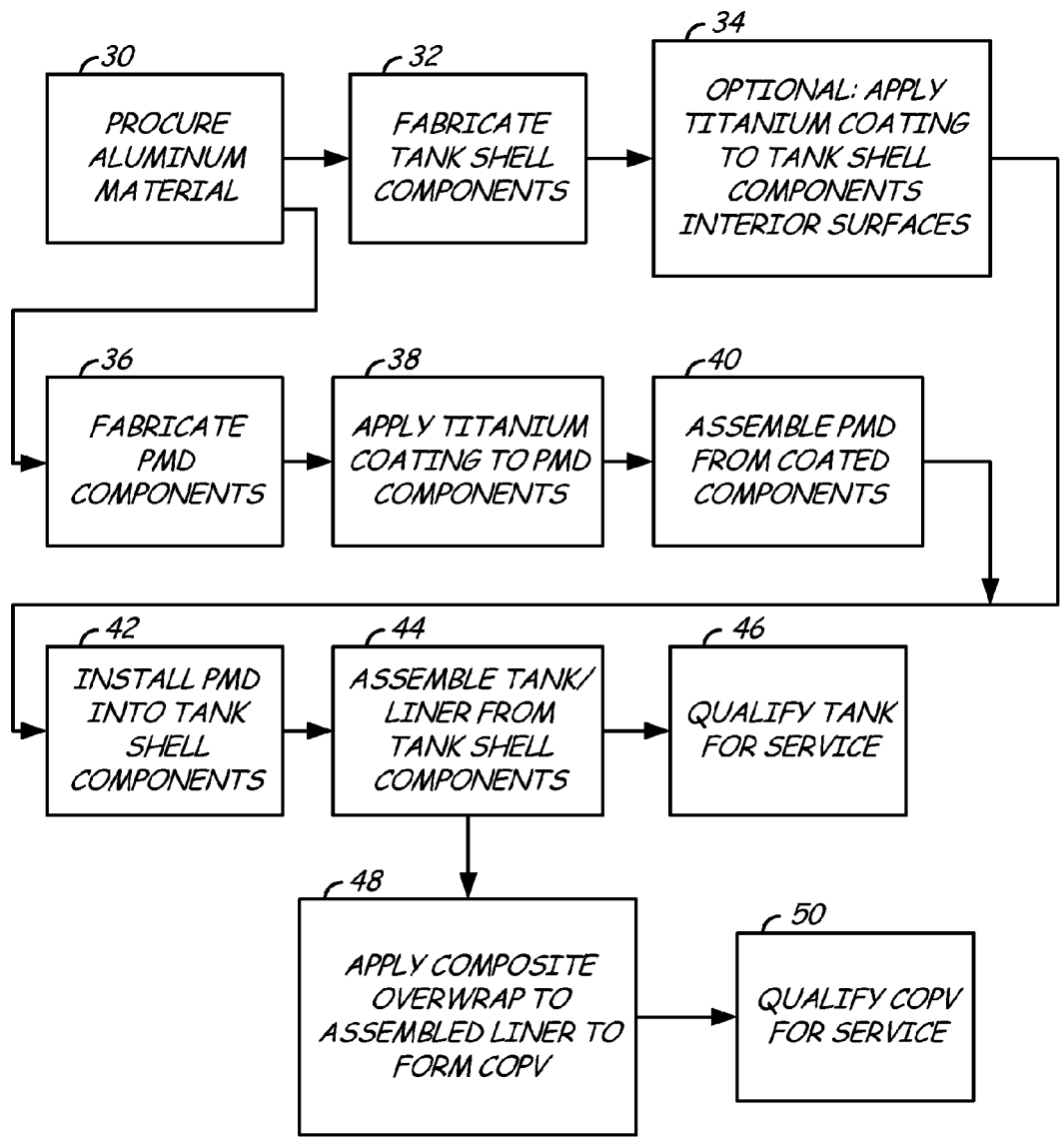
FIG. 2 is a diagram showing fabrication steps of a demisable fuel supply system.

A method of fabricating demisable fuel systems with pressurized aluminum propellant tanks and with COPV tanks is shown in FIG. 2. The process starts with the procurement of aluminum alloy material, preferably sheet stock. (Step 30). Liquid propellant tank shell sections are then fabricated from the sheet stock, preferably by spinning and other methods known in the art (Step 32). A preferred thickness of the tank sections is between about 0.9 millimeters and 7 millimeters. Aluminum alloys suitable for the tank include, but are not limited to, 6061, 2219, and 2014 alloys.

Optionally, the interior surface or portions of the interior surface of the tank shell sections are then coated with a titanium based coating. (Step 34). Preferably, titanium based coatings for the tank shell interior sections include, but are not limited to, pure titanium and Ti-6Al-4V and Ti-15V-3Cr-3Sn-3Al alloys. The thickness of the titanium based coating is between about 1 micron and about 10 microns.

Aluminum PMD components such as vanes, sponges, traps, troughs, and others are then fabricated or acquired from qualified vendors. (Step 36). Aluminum alloys suitable for the PMD components include, but are not limited to, 6061, 2219, and 2014 alloys.

A titanium based coating is then applied to the PMD components (Step 38). Suitable coatings include, but are not limited to, pure titanium and Ti-6Al-4V and Ti-15V-3Cr-3Sn-3Al alloys (Step 38). The PMD components are then assembled into PMD fixtures by processes known in the art (Step 40) and then installed into the tank shell components (Step 42). The PMD components are installed into the tank shell components by attaching the components to the tank shell by welding, braising, mechanical fasteners, or other methods known in the art (Step 42).

The tank shell components containing installed PMD devices are then assembled and joined into finished tanks and liners (Step 44). Assembling and jointing comprises gas tungsten arc welding, electron beam welding, laser beam welding and other methods known in the art. If the finished product is a tank, the tank is then qualified for service (Step 46). If the finished product is a COPV, the assembled liner containing installed PMD devices is then overwrapped with composite fibers to form a COPV (Step 48). The COPV is then qualified for service (Step 50).

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A demisable fuel supply system comprising:
aluminum alloy liquid storage tank for storing a liquid propellant;
aluminum alloy propellant management devices; and
a highly wettable and corrosion resistant titanium based coating selected from the group consisting of pure titanium, and Ti-6Al-4V, and Ti-15V-3Cr-3Sn-3Al alloys covering selected internal surfaces of the liquid storage tank and propellant management devices.

2. The demisable fuel supply system of claim 1, wherein the titanium based coating is Ti-6Al-4V alloy.

3. The demisable fuel supply system of claim 1, wherein the titanium based coating has a thickness of from about 1 micron to about 10 microns.

4. The demisable fuel supply system of claim 1, wherein the titanium based coating is deposited by at least one of physical vapor deposition, chemical vapor deposition, sputtering, electroplating, and ion beam deposition.

5. The demisable fuel supply system of claim 1, wherein the aluminum alloy is selected from the group consisting of 6061, 2219, and 2014 alloys.

6. The demisable fuel supply system of claim 5, wherein the aluminum alloy is 6061 alloy.

7. The demisable fuel supply system of claim 1, wherein the liquid storage tank has a section thickness of from about 0.9 millimeters to about 7 millimeters.

8. The demisable fuel supply system of claim 1, wherein the liquid propellant comprises mono or bipropellant fuels.

9. The demisable fuel supply system of claim 8, wherein the mono propellant fuel comprises hydrazine.

10. A method of making a demisable fuel supply system comprising:
fabricating liquid storage tank sections;
fabricating propellant management device (PMD) components;
attaching PMD components to the interior surfaces of the liquid storage tank sections;
coating selected storage tank section interiors and the PMD components with a highly wettable and corrosion resistant titanium based coating selected from the group consisting of pure titanium, and Ti-6Al-4V, and Ti-15V-3Cr-3Sn-3Al alloy;
assembling the populated storage tank sections to form a finished liquid storage tank.

11. The method of claim 10, wherein the storage tank sections and PMD components are made from an aluminum alloy.

12. The method of claim 11, wherein the aluminum alloy is selected from a group consisting of 6061, 2215, and 2014 alloys.

13. The method of claim 12, wherein the aluminum alloy is 6061 alloy.

14. The method of claim 10, wherein the PMD components are attached to the storage tank sections by welding, brazing, or with mechanical fasteners.

15. The method of claim 10, wherein the titanium based coating has a thickness of from about 1 micron to about 10 microns.

16. The method of claim 10, wherein the liquid storage tank sections are assembled by at least one of gas tungsten arc welding, electron beam welding, and laser beam welding.

17. The method of claim 10, wherein the liquid storage tank has a section thickness from about 0.9 millimeters to about 7 millimeters.

18. The method of claim 10, wherein the titanium based coating is deposited by at least one of physical vapor deposition, chemical vapor deposition, sputtering, electroplating, and ion beam deposition.

* * * * *